US011448541B2

(12) United States Patent
Fredsall

(10) Patent No.: US 11,448,541 B2
(45) Date of Patent: Sep. 20, 2022

(54) MANUALLY-OPERATED GRANULAR SUBSTANCE DISPENSER

(71) Applicant: Gil Fredsall, Whitehall, MT (US)

(72) Inventor: Gil Fredsall, Whitehall, MT (US)

( * ) Notice: Subject to any disclaimer, the term of this patent is extended or adjusted under 35 U.S.C. 154(b) by 451 days.

(21) Appl. No.: 16/622,603

(22) PCT Filed: Jun. 18, 2018

(86) PCT No.: PCT/US2018/038018
§ 371 (c)(1),
(2) Date: Dec. 13, 2019

(87) PCT Pub. No.: WO2018/232385
PCT Pub. Date: Dec. 20, 2018

(65) Prior Publication Data
US 2021/0148744 A1 May 20, 2021
US 2021/0356308 A9 Nov. 18, 2021

Related U.S. Application Data

(60) Provisional application No. 62/520,742, filed on Jun. 16, 2017.

(51) Int. Cl.
*G01F 11/24* (2006.01)
*A47J 31/40* (2006.01)
*B65D 83/06* (2006.01)

(52) U.S. Cl.
CPC .............. *G01F 11/24* (2013.01); *A47J 31/404* (2013.01); *B65D 83/06* (2013.01); *B65D 2203/12* (2013.01)

(58) Field of Classification Search
CPC ........ G01F 11/24; A47J 31/404; B65D 83/06; B65D 2203/12
See application file for complete search history.

(56) References Cited

U.S. PATENT DOCUMENTS 2,898,010 A * 8/1959 Tepper .................... B65D 83/06
222/339
2,904,230 A * 9/1959 Worth ...................... G01F 11/24
222/362

(Continued)

FOREIGN PATENT DOCUMENTS

DE 2838946 A1 3/1980
JP 59-185625 12/1984

OTHER PUBLICATIONS

International Search Report issued in corresponding PCT Application No. PCT/JP2018/038018, dated Sep. 14, 2018, 10 pages.

(Continued)

*Primary Examiner* — Paul R Durand
*Assistant Examiner* — Bob Zadeh
(74) *Attorney, Agent, or Firm* — MKG, LLC

(57) ABSTRACT

A dispenser includes a housing having an upper and a lower portion. The upper portion includes a storage compartment having a floor and retaining a granular substance. The lower portion includes a spout. A first outlet extends through the floor. A manually rotatable upper disc is disposed below the floor, and has a second outlet therethrough. A manually rotatable lower disc is disposed between the upper disc and the lower portion. The lower disc includes a third outlet therethrough. Rotation of the upper disc aligns the second outlet with the first outlet and the granular substance passes through the first to the second outlet. Rotation of the lower disc through one or more positions permits a variable amount of the granular substance to pass from the second to the third outlet. Further rotation of the lower disc aligns the third outlet with the spout to dispense the granular substance.

22 Claims, 13 Drawing Sheets

(56) References Cited

U.S. PATENT DOCUMENTS

| | | | |
|---|---|---|---|
| 3,130,874 A | | 4/1964 | Bulmer |
| 3,323,683 A | | 6/1967 | Cianciolo |
| 3,991,908 A | * | 11/1976 | Thomas ............. B65D 83/0409 |
| | | | 221/265 |
| 4,032,050 A | * | 6/1977 | Funk ........................ G01F 11/24 |
| | | | 222/362 |
| 4,174,058 A | * | 11/1979 | Bassignani ............. G01F 11/24 |
| | | | 222/452 |
| 4,691,821 A | | 9/1987 | Hofmann |
| 4,832,235 A | * | 5/1989 | Palmer .................... G01F 11/24 |
| | | | 222/548 |
| 5,271,535 A | | 12/1993 | Fridman et al. |
| 6,189,742 B1 | * | 2/2001 | Thomson ................ A47G 19/34 |
| | | | 222/362 |
| 6,283,339 B1 | * | 9/2001 | Morrow ................... G01F 23/24 |
| | | | 222/548 |
| 8,827,185 B2 | | 9/2014 | Simmons et al. |
| 2007/0000953 A1 | * | 1/2007 | Ranney ................... G01F 11/46 |
| | | | 222/438 |
| 2007/0228083 A1 | * | 10/2007 | Catani ..................... G01F 11/46 |
| | | | 222/452 |
| 2015/0083758 A1 | * | 3/2015 | Ismail ..................... A47J 47/01 |
| | | | 222/454 |
| 2015/0233748 A1 | | 8/2015 | Egnor, Jr. |
| 2021/0148744 A1 | * | 5/2021 | Fredsall ................ A47J 31/404 |

OTHER PUBLICATIONS

Supplementary European Search Report issued in corresponding PCT Application No. PCT/US2018/038018, dated Jan. 29, 2021, 9 pages.

Office Action issued in corresponding Canadian Patent Application No. 3,067,049, dated Mar. 11, 2021.

Commissioner's Notice—Application Found Allowable issued in corresponding Canadian Patent Application No. 3,067,049, dated Feb. 14, 2022.

Communication under Rule 71(3) EPC issued in corresponding European Patent Application No. 18818055.8, dated Apr. 12, 2022.

International Preliminary Report on Patentability issued in corresponding PCT Application No. PCT/US2018/038018, dated Feb. 12, 2020, 27 pages.

* cited by examiner

MANUALLY-OPERATED GRANULAR SUBSTANCE DISPENSER

CROSS REFERENCE TO RELATED APPLICATIONS

This application is a U.S. National Stage of and claims the benefit under 35 U.S.C. § 371 to International Patent Application Ser. No. PCT/US2018/038018, filed on Jun. 18, 2018, which claims the benefit of U.S. Provisional Patent Application Ser. No. 62/520,742, filed on Jun. 16, 2017. The disclosures of the aforementioned International and U.S. patent documents are incorporated herein by reference in their entirety.

TECHNICAL FIELD

The present invention is directed to a manually-operated dispenser that dispenses ground coffee or other granular substances. More particularly, the invention provides a dispenser that stores, measures and dispenses a variable or predetermined amount or volume of a granular substance suitable for a single-serving size of the substance.

BACKGROUND

Single-serving size coffee brewing machines for use at a home or a business typically use a pre-packaged, single-serving size coffee container. One such coffee brewing machine is manufactured by Keurig Green Mountain, Inc., and uses a pre-packaged, single-serving size coffee container or coffee pod known as a K-cup® (K-CUP is a registered trademark owned by Keurig Green Mountain, Inc.). The amount or volume of coffee grounds put into the container or pod is determined by the supplier of the pre-packaged container or pod. Accordingly, the user of the brewing machine varies the amount or ratio of liquid added to, mixed with or brewed within the container or pod to achieve a beverage of desired strength. It should be appreciated that as generally recognized in this technical field of art, and as used herein, the term "strength" relates to a ratio of granular substance mixed with a liquid. For example, the greater the amount or ratio of granular substance as compared to liquid, the "stronger" the resulting mixture. Conversely, the lesser the amount or ratio of granular substance as compared to liquid, the "weaker" the resulting mixture. For example, to achieve a stronger or more robust brewed cup of coffee, a greater amount or ratio of granular coffee is used as compared to hot water. Similarly, to achieve a stronger or sweeter flavored beverage, a greater amount or ratio of granular sugar or other sweetener is used as compared to water or other liquid of the beverage.

Additionally, while it is known to use a re-useable single-serving size coffee container or filter with the above-described coffee brewing machine, it is difficult to fill such a single-serving size coffee container or filter in a consistent, uniform manner. This task may be particularly difficult in early morning hours before a user has had a first cup of coffee.

Therefore, it is an object of the present invention to provide a manually-operated dispenser that conveniently stores, measures and dispenses a consistent, uniform amount or volume of a granular substance such as, for example, ground coffee, into a container or receptacle such as, for example, a single-serving size coffee container or filter for use with a single-serving size coffee brewing machine.

SUMMARY

An embodiment of a dispenser that stores, measures and dispenses a granular substance includes a housing having an upper portion and a lower portion. The upper portion of the housing includes a storage compartment defined by a floor and a side wall coupled thereto. The floor and the side wall are configured to retain a granular substance in the storage compartment. The lower portion of the housing includes a support platform and a side wall coupled thereto and defining an interior cavity. A spout is disposed in the interior cavity. The floor includes an aperture or first outlet that extends through the floor. The dispenser also includes an upper disc disposed below the floor of the storage compartment. The upper disc has an aperture or second outlet extending therethrough. In one embodiment, the upper disc includes a first tab that is engageable to manually rotate the upper disc about a central axis of rotation. The dispenser also includes a lower disc disposed between the upper disc and the lower portion of the housing. The lower disc has an aperture or third outlet extending therethrough. In one embodiment, the lower disc has a second tab that is engageable to manually rotate the lower disc about the central axis of rotation. Rotation of the upper disc causes the second outlet to align with the first outlet and permits the granular substance to pass out of the storage compartment through the first outlet. Rotation of the lower disc causes the third outlet to align with the spout and dispenses the granular substance into a receptacle placed below the spout.

An embodiment of a dispenser for measuring and dispensing a granular substance includes a housing having an upper portion and a lower portion. The upper portion includes a storage compartment having a floor and configured to retain a granular substance. A first outlet extends through the floor of the storage compartment. The lower portion includes a support platform and a spout. An upper disc is disposed below the floor of the storage compartment, and has a second outlet extending therethrough and a first tab that is engageable to manually rotate the upper disc. A lower disc is disposed between the upper disc and the lower portion, has a third outlet extending therethrough, and has a second tab that is engageable to manually rotate the lower disc. Rotation of the upper disc causes the second outlet to align with the first outlet and permit the granular substance to pass through the first outlet, and rotation of the lower disc causes the third outlet to align with the spout and dispense the granular substance into a receptacle placed below the spout.

An embodiment of a method of measuring and dispensing a granular substance includes disposing a granular substance in a storage compartment of a dispenser having a floor and configured to retain the granular substance. The storage compartment is located in an upper portion of a housing. The housing includes the upper portion and a lower portion including a support platform and a spout. The storage compartment has a first outlet extending through the floor of the storage compartment, and the dispenser includes an upper disc disposed below the floor of the storage compartment and a lower disc disposed between the upper disc and the lower portion. The method further includes manually rotating the upper disc so that a second outlet extending therethrough aligns with the first outlet and permits the granular substance to pass therethrough, and manually rotating the lower disc so that the third outlet aligns with the spout and dispenses the granular substance into a receptacle placed below the spout.

DETAILED DESCRIPTION

Figure 1:
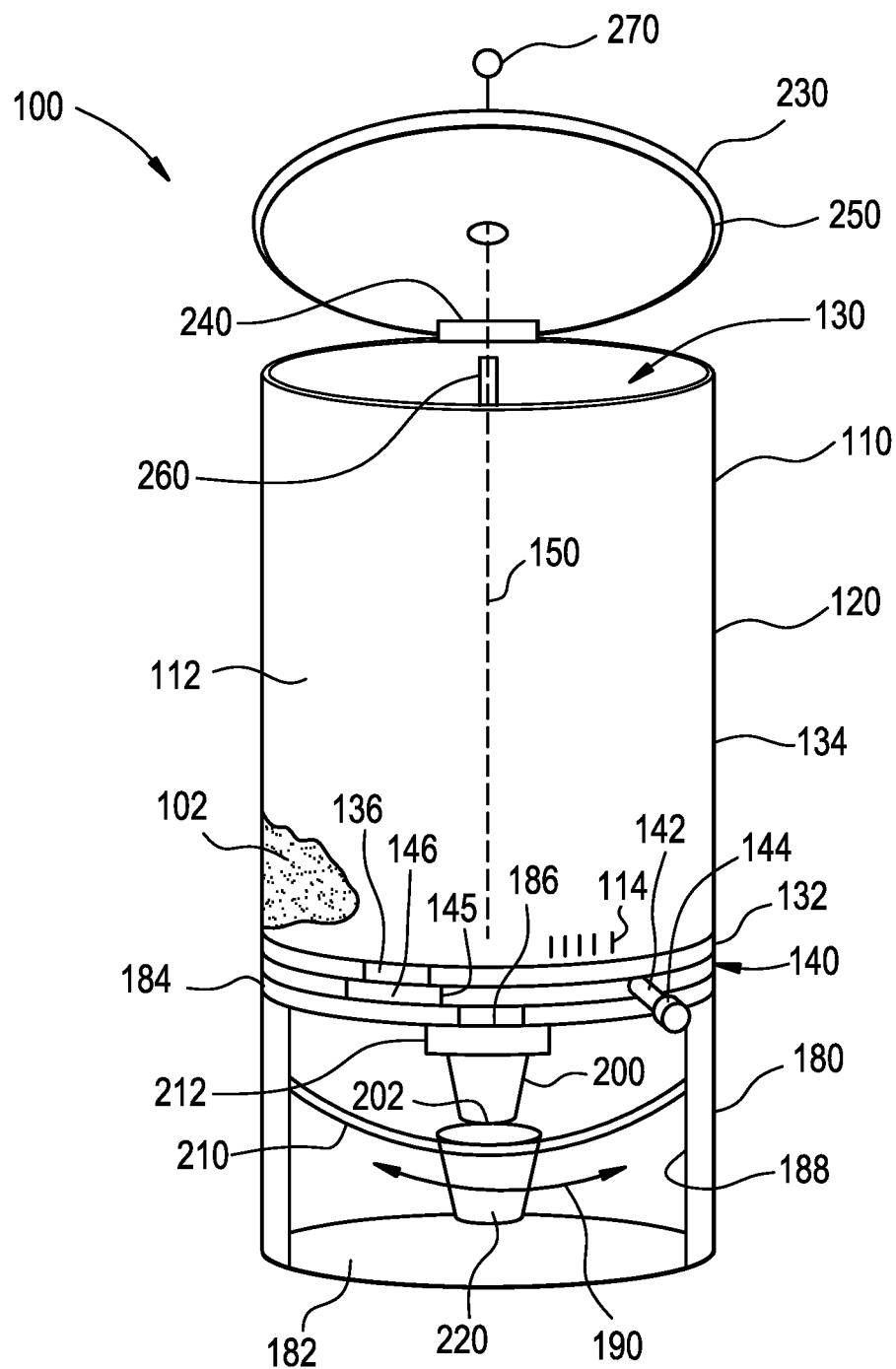
FIG. 1 is a front elevation view of one embodiment of a manually-operated dispenser that stores, measures and dispenses an amount or volume of a granular substance in accordance with the present invention.

A dispenser that stores, measures and dispenses an amount or volume of a dry, granular or ground substance is disclosed herein. The dispenser includes a housing having a compartment for storing the granular substance. A manually operated mechanism is coupled to the housing to dispense a variable or a pre-selected amount or volume of the granular substance. The granular substance may be ground coffee, sugar, drink mix, milk powder, powdered creamer or any other suitable powder or granular substance. In one embodiment, the dispenser is a single-serving size dispenser that dispenses an amount or volume equivalent to a single-serving size, which may be a pre-selected or variable amount or volume of the granular substance, to achieve a desired ratio or strength when later mixed with a liquid in a beverage of choice. For example, the dispenser can be configured to dispense an amount or volume of coffee grounds or other granular substance into a receptacle such as a filter, or single-serving size coffee container or pod.

In one embodiment, the dispenser includes a housing having an upper portion including a storage compartment, and a lower portion including a support platform, a ceiling and a side wall coupled therebetween to define an interior cavity. A spout is coupled to the ceiling and disposed in the interior cavity. In one embodiment, an intermediate portion is disposed between the upper portion and the lower portion of the housing. The storage compartment includes an aperture or first outlet extending through a floor of the storage compartment. At least one rotatable disc having a second outlet is mounted below the floor of the storage compartment. The at least one rotatable disc is configured to be manually rotated about an axis of rotation to align the second outlet with the first outlet and to allow an amount or volume of granular substance to be dispensed from the storage compartment through the first outlet and into or through the second outlet. In one embodiment, the granular substance is dispensed from the storage compartment to the lower portion. In one embodiment, the granular substance is dispensed from the storage compartment to the intermediate portion.

In one embodiment, the at least one rotatable disc includes an upper disc disposed below the floor of the storage compartment. The upper disc has the second outlet extending therethrough. A first tab is coupled to the upper disc and is engageable to manually rotate the upper disc about the axis of rotation. In one embodiment, the at least one rotatable disc further includes a lower disc disposed between the upper disc and the lower portion. The lower disc has a third outlet extending therethrough. A second tab is coupled to the lower disc and is engageable to manually rotate the lower disc about the axis of rotation. The ceiling includes an aperture or fourth outlet therethrough. The spout is coupled to the ceiling over the fourth outlet. Rotation of the upper disc causes the second outlet to align with the first outlet and permits the granular substance to pass through the first outlet. Rotation of the lower disc causes the third outlet to align with the fourth outlet and the spout and to dispense the granular substance into a receptacle placed below the spout. In one embodiment, the intermediate portion is disposed between the upper disc and the lower disc, receives the granular substance passing through the first outlet and the second outlet when the upper disc is rotated, and permits dispensing of the granular substance from the intermediate portion when the lower disc is rotated and aligns the third outlet with the fourth outlet and the spout.

FIG. 1 depicts an embodiment of a manually-operated dispenser 100 that stores, measures and dispenses a variable or predetermined amount or volume of a granular substance 102, such as ground coffee. In one embodiment, the dispenser 100 is configured to dispense a pre-determined, fixed amount or volume as a single-serving size of ground coffee 102 suitable for a single-serving size coffee container or filter for use with a single-serving size coffee brewing machine. In another embodiment, the dispenser 100 is configured to dispense a variable amount or volume as the single-serving size of ground coffee 102. For example, and as described herein, the variable amount or volume may be selectively defined by a user of the dispenser 100 to include more or less of the granular substance 102 to suit one or more different desired strengths of a beverage. In one embodiment, the variable amount or volume of the granular substance 102 may include a plurality of amounts or volumes of single-serving sizes of varying strengths desirable to one or more users of the dispenser 100. In one embodiment, the plurality of amounts or volumes of single-serving sizes are selectively customizable by the one or more users of the dispenser 100.

As illustrated in FIG. 1, the dispenser 100 includes a housing 110 having an upper portion 120 and a lower portion 180. The upper portion 120 provides a storage compartment 130 for a granular or ground substance 102 such as, for example, ground coffee. It should be appreciated, however, that any granular substance may be placed within the storage compartment 130 without departing from the present invention. In one embodiment, the storage compartment 130 is defined by a floor 132 and a side wall 134 coupled thereto. In one embodiment, the floor 132 and the side wall 134 form a cylindrical shape of the storage compartment 130 to provide a cylindrical storage canister. It should be appreciated, however, that the storage compartment 130 may be formed into any geometric shape, such as for example, a square, a rectangular or a polygonal, without departing from the present invention. In one embodiment, the storage compartment 130 defines an interior volume sufficient to house or contain at least one pound of ground coffee therein. The floor 132 of the storage compartment 130 includes an aperture or first outlet 136 that extends through the floor 132 to allow a predetermined or variable amount of the granular substance 102 to pass from the storage compartment 116 when the dispenser 100 is operated.

In one embodiment, the dispenser 100 includes a lid 230 disposed over the upper portion 120 of the housing 110 to encapsulate the storage container 130. The lid 230 is connected to the upper portion 120 by, for example, a hinge 240 or other suitable fastening mechanism, such that the lid 230 is moveable between an open position providing access for filling the storage compartment 130, and a closed position thereby sealing the storage compartment 130 of the upper portion 120. In one embodiment, the dispenser 100 includes a gasket 250 disposed about a periphery of the side wall 134 that cooperates with the lid 230 to seal the encapsulated storage compartment 130.

In one embodiment, the lower portion 180 of the housing 110 includes a support platform or base 182, a ceiling 184 and a side wall 188 coupled therebetween to define an interior cavity 190. The ceiling 184 of the lower portion 180 includes an aperture or fourth outlet 186 therethrough. In one embodiment, the dispenser 100 further includes a funnel or spout 200 coupled to the ceiling 184 and aligned with the fourth outlet 186. In one embodiment, the interior cavity 190 provides access for positioning a receptacle 220 under the spout 200 such that the ground coffee or another granular substance 102 is discharged or dispensed from the dispenser 100 through the fourth outlet 186 to the spout 200 and into the receptacle 220. In one embodiment, the receptacle 220 includes, for example, a cup or mug, or a single-serving sized coffee container or filter. In one embodiment, the lower portion 180 of the housing 110 or the spout 200 includes a holder 210 and/or 212, respectively, for positioning and releasably attaching or holding the receptacle 220 beneath the spout 200.

In one embodiment, the support platform 182 of the lower portion 180 is circular or semi-circular in shape having an angular extent that is greater than about 180° to provide suitable support surface for the dispenser 100. In one embodiment, the support platform 182 is semi-circular in shape having an angular extent that is greater than 210°. In one embodiment, the support platform 182 is semi-circular in shape having an angular extent that is greater than 240°.

In one embodiment, the dispenser 100 includes at least one manually rotatable disc disposed between the storage compartment 130 and the lower portion 180. In one embodiment, an upper disc 140 is disposed below the floor 132 of the storage compartment 130 and above the ceiling 184 of the lower portion 180. The upper disc 140 includes an aperture or second outlet 146 extending through the upper disc 140. The aperture or second outlet 146 is configured to receive an amount of granular material 102 when the second outlet 146 is at least partially aligned with or overlaps the first outlet 136 of the floor 132 of the storage compartment 130. As described herein, the first outlet 136 and the second outlet 146 are "aligned" or "overlap" when at least a portion of the first outlet 136 is directly above the second outlet 146 to permit the granular substance 102 to pass for example, by gravity, from the storage compartment 130 through the first outlet 136 and through the second outlet 146. In accordance with one aspect of the present invention, the amount or volume of the granular substance 102 that passes through the first outlet 136 and the second outlet 146 is selectively controllable by the extent or degree of alignment or overlap of the first outlet 136 and the second outlet 146. For example, when the first outlet 136 and the second outlet 146 are fully or completely aligned and an entirety of the area of the first outlet 136 is directly above the area of the second outlet 146, or when an entirety of the area of the second outlet 146 is directly below the area of the first outlet 136, a maximum amount or volume of granular substance 102 passes from the storage compartment 130 through the first outlet 136 and the second outlet 146. Alternatively, no amount or volume of the granular substance 102 passes through the first outlet 136 and the second outlet 146 when the outlets 136 and 146 are not aligned and do not overlap. Accordingly, variation in the extent or degree of alignment or overlap, for example, between fully aligned/overlapping and not aligned/overlapping, varies the amount or volume of the granular substance 102 that passes through the outlets 136 and 146. In one embodiment, the upper disc 140 includes a first tab or projection 142 extending therefrom to allow a user to rotate the upper disc 140 about a central axis of rotation 150. In one embodiment, the first tab 142 is comprised of an arm 144 extending outwardly from the upper disc 140 and beyond an exterior surface 112 of the housing 110 and thus, the dispenser 100, to be more easily accessible by a user of the dispenser 100. In one embodiment, the dispenser 100 includes a central shaft or spindle 260 colinear with the central axis of rotation 150. In one embodiment, the upper disc 140 is mounted to and rotates about the central shaft or spindle 260. In one embodiment, the spindle 260 includes a knob 270 affixed to a distal end thereof permitting removal of the spindle 260 to facilitate, for example, disassembly of the dispenser 100.

In one embodiment, the upper disc 140 is rotatable from a first or inactive position where the aperture or second outlet 146 is not aligned with the first outlet 136 of the floor 132 of the storage compartment 130, to at least one second or active position where the second outlet 146 is at least partially aligned with the first outlet 136 such that an amount of the granular substance 102 can pass from the storage compartment 130 through the first outlet 136 and to the second outlet 146. In one embodiment, the granular substance 102 retained within the second outlet 146, for example, is bound by walls 145 formed by the thickness of the upper disc 140 and by a surface of the ceiling 184 of the lower portion 180 of the housing 110, such that the second outlet 146 transfers the granular substance 102 from the at least one second position to a third position where the second outlet 146 of the upper disc 140 at least partially aligns with or overlaps the aperture or fourth outlet 186 of the ceiling 184 of the lower portion 180 to deliver the granular substance 102 to the spout 200.

Figure 2:
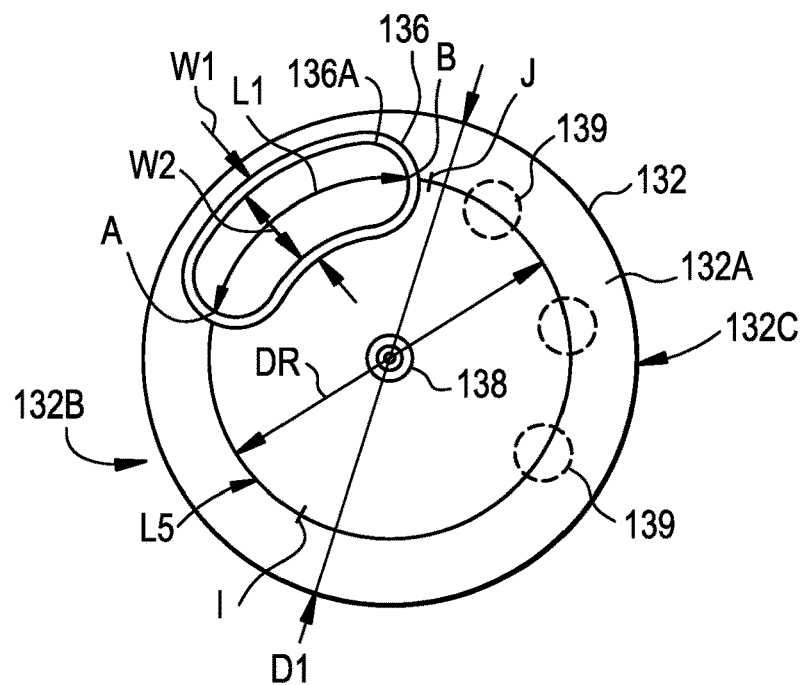
FIG. 2 is a top view of a floor of a storage compartment of the dispenser of FIG. 1.

FIGS. 2, 3, 4 and 5 illustrate an interaction between the floor 132 of the storage compartment 130, the ceiling 184 of the lower portion 180, and the at least one disc, for example, the upper disc 140, during operation of the dispenser 100, in accordance with one embodiment. As shown in FIG. 2, the floor 132 of the storage compartment 130 includes an upper surface 132A, a lower surface 132B (shown in FIG. 5) opposite the upper surface 132A and, in one embodiment, has a circular configuration 132C of a diameter D1. The floor 132 includes a central aperture 138 extending from the upper surface 132A to the lower surface 132B, for receiving the spindle 260 therethrough. As shown in FIG. 2, the first outlet 136, which extends from the upper surface 132A to the lower surface 132B, has an ovular shape that corresponds with the circular configuration 132C. For example, the first outlet 136 has an arcuate shape that includes an elongated portion having a width W1, and a length L1 (an arc length) defined along a rotational diameter DR. The length L1 is defined by end points A and B along the rotational diameter DR. The first outlet 136 is bounded by first and second opposing end portions at end points A and B. As illustrated, the rotational diameter DR is less than the diameter D1 of the circular configuration 132C of the floor 132.

In one embodiment, the first outlet 136 includes a raised and/or tapered knife edge or lip 136A extending outwardly from the width W1 of the floor 132. In one embodiment, the lip 136A extends outwardly and downwardly, e.g., toward the lower portion 180 and beyond the lower surface 132B of the floor 132, to provide a seal between the floor 132 and the upper disc 140 operating below it to substantially minimize, if not prevent, the granular material 102 migrating to unwanted areas between the floor 132 and the upper disc 140. Alternatively, or additionally, the lip 136A may extend outwardly and upwardly from the upper surface 132A of the floor 132 into the storage compartment 130. The lip 136A defines a width W2, which in one embodiment is less than the width W1 (i.e., W1>W2). In one embodiment, the width W2 is greater than the width W1 (i.e., W1<W2). In one embodiment, the width W2 is at least approximately equal to the width W1 (i.e., W1≅W2).

In one embodiment, the first outlet 136 is integrally formed with the floor 132 of the storage compartment 130. In one embodiment, the first outlet 136 includes an insert fixedly assembled within the floor 132. The lip 136A may be integrally formed with the floor 132 of the storage compartment 130 or may be an insert fixedly assembled within the floor 132. In one embodiment, the first outlet 136 having the lip 136A is an insert fixedly assembled within the floor 132 of the storage compartment 130. In one embodiment, such inserts are fabricated from a metal or metal alloy.

In one embodiment, the floor 132 includes one or more protrusions 139 extending outwardly and/or downwardly from the lower surface 132B to facilitate rotation of the upper disc 140. For example, the one or more protrusions 139 are fixedly attached to the lower surface 132B of the floor 132 as one or more guide pads against which an upper surface 140A of the upper disc 140 traverses or rides. In one embodiment, the protrusions 139 are positioned along the central rotational diameter DR. The protrusions 139 may be integrally formed with the floor 132 of the storage compartment 130 or fixedly attached to the lower surface 132B of the floor 132.

Figure 3:
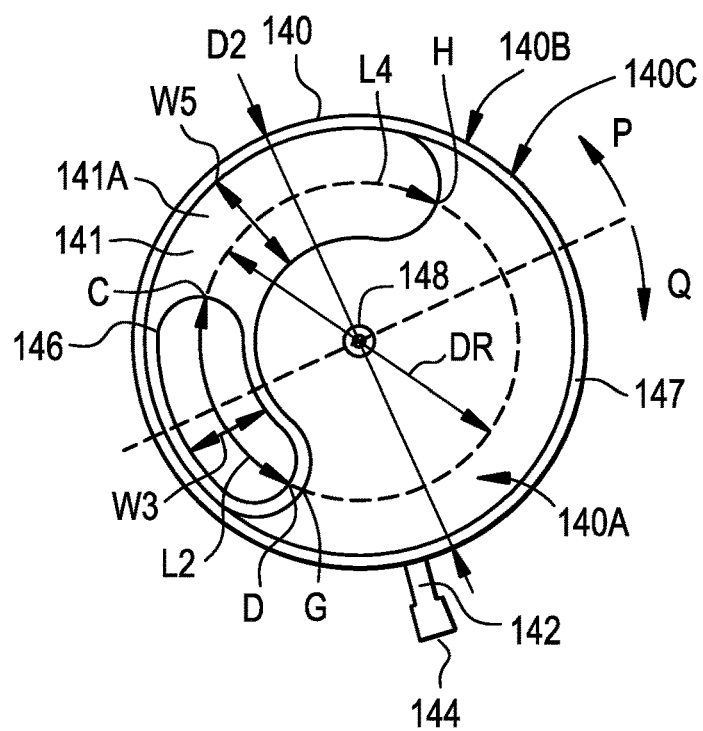
FIG. 3 is a top view of a rotatable upper disc of the dispenser of FIG. 1.

Referring to FIG. 3, in one embodiment, the upper disc 140 includes features that correspond to the features of the floor 132 of the storage compartment 130. For example, the upper disc 140 includes the upper surface 140A and a lower surface 140B and defines a circular configuration 140C having a diameter D2 and includes a central aperture 148 for receiving the spindle 260 therethrough. In one embodiment, the diameter D2 of upper disc 140 is substantially equal to the diameter D1 of the floor 132. In one embodiment, the second outlet 146 has an ovular shape that corresponds with the circular configuration 140C of the upper disc 140. For example, the second outlet 146 has an arcuate shape that includes an elongated portion having a width W3, and a length L2 (an arc length) defined along the rotational diameter DR. The length L2 is defined by end points C and D along the rotational diameter DR. The second outlet 146 is bounded by first and second opposing end portions at end points C and D. In one embodiment, the second outlet 146 is sized to receive and dispense a predetermined amount of ground coffee or other granular substance 102, e.g., for a single-serving coffee container or filter for use with a single-cup coffee brewing machine. In one embodiment, the second outlet 146 is at least approximately the same size and shape as the first outlet 136 or may have a different size and/or shape. For example, the width W3 of the second outlet 144 is greater than the width W1 and/or W2 of the first outlet 140 (i.e., W3>W1 and/or W3>W2). In another example, the width W3 is at least approximately equal to the greater of the widths W1 and W2 (i.e., W3≅W1 or W3≅W2). In one embodiment, the length L2 is approximately equal to the arc length L1 (i.e., L2≅L1), or is greater than the arc length L1 (i.e., L2>L1).

Figure 4:
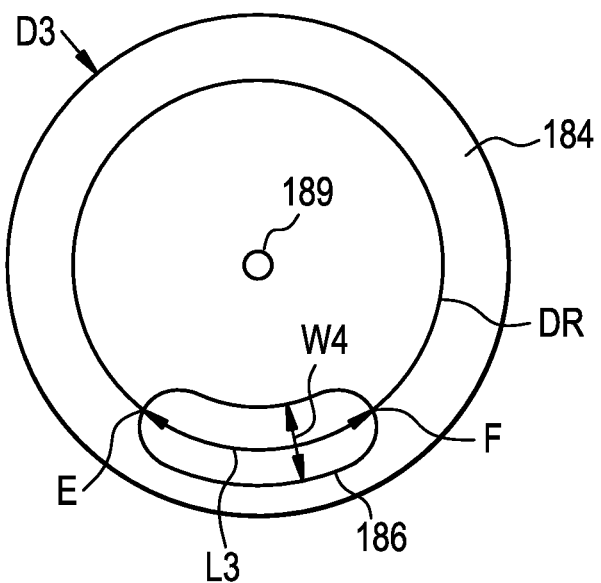
FIG. 4 is a top view of a ceiling of a lower portion of a housing of the dispenser of FIG. 1.

Referring to FIG. 4, the fourth outlet 186 of the ceiling 184 of the lower portion 180 and/or the spout 200 may be sized and shaped correspondingly to the second outlet 146 of the upper disc 140. For example, the ceiling 184 has a diameter D3. In one embodiment, the diameter D3 is at least approximately equal to the diameter D2 of the upper disc 140. The fourth outlet 186 has an arcuate shape that includes an elongated portion having a width W4, and a length L3 (an arc length) defined along the rotational diameter DR. The length L3 is defined by end points E and F along the rotational diameter DR. The fourth outlet 186 is bounded by the opposing end portions at end points E and F. In one embodiment, the width W4 is equal to or greater than the width W3 of the second outlet 146. In one embodiment, the fourth outlet 186 is a circular outlet having a diameter than is greater than the width W3 of the second outlet 146 of the upper disc 140 (i.e., (i.e., W4>W3), or having a diameter than is at least approximately equal to the width W3 (i.e., W4≅W3). In one embodiment, the ceiling 184 has a central aperture 189 for receiving the spindle 260 therethrough.

With reference briefly to FIG. 1, in one embodiment, the spout 200 has an upper portion having a width or diameter that is greater than or at least approximately equal to the width W4 and/or the length L3 of the fourth outlet 186. The spout 200 tapers or narrows as it extends downwardly away from the fourth outlet 186 and the ceiling 184 and into the interior cavity 190. In one embodiment, the spout 200 has an exit end 202 that is sized and shaped to correspond to a size of the receptacle 220, e.g., a single-serving coffee container or filter.

Referring again to FIGS. 2, 3 and 4, in one embodiment, the upper disc 140 is rotated about the central axis of rotation 150 in relation to the storage compartment 130 and the floor 132 thereof, and the lower portion 180 and ceiling 184 thereof, which each remain stationary. The rotation of the upper disc 140, for example, with the arm 144, results in a rotation of the second outlet 146 along the central rotational diameter DR. In one embodiment, illustrated in FIG. 3, the upper disc 140 is at a first or inactive position where the second outlet 146 does not align with and does not overlap the first outlet 136 of the floor 132 (FIG. 2), as no portion of L1 and L2 overlap. In the first or inactive position, the second outlet 146 also does not align with and does not overlap the fourth outlet 186 of the ceiling 184 (FIG. 4), as no portion of L2 and L3 overlap. When the upper disc 140 is rotated about the central axis of rotation 150 in, for example, a clockwise direction indicated by arrow Q, and the upper disc 140 reaches at least one second or active position, where the second outlet 146 at least partially aligns or overlaps the first outlet 136, the second outlet 146 receives an amount or volume of the granular substance 102, e.g., through the aligned or overlapping portions of L1 and L2. If rotation continues in the clockwise direction indicated by the arrow Q, an increased amount or volume of the granular substance 102 is received by the second outlet 146 due to an increase in alignment with the first outlet 136, where a maximum amount or volume of granular substance 102 is received when the second outlet 146 completely overlaps the first outlet 136 (i.e., is disposed directly beneath or below the first outlet 136). In one embodiment, the second, active position includes a plurality of second or active positions, where each active position within the plurality of second positions is indicative of a larger degree of alignment or overlap between the first outlet 136 and the second outlet 146 and thus, a greater amount or volume of granular substance 102 being received by the second outlet 146. In one embodiment, the dispenser 100 includes indicia 114 on the exterior surface 112 of the housing 110 and/or on an exterior surface of the upper disc 140 proximate the arm 144 (as shown in FIG. 1). The indicia 114 indicates a plurality of settings that each correspond to one of the plurality of second, active positions, a degree of alignment or overlap between the first outlet 136 and the second outlet 146 (extent that L1 and L2 overlap), and thus an increasingly greater amount or volume of granular substance 102 received by the second outlet 146 in a corresponding one of the plurality of second positions. For example, in one embodiment, a first setting corresponds to a single-serving size of the granular substance of a volume of one half of one tablespoon, a second setting corresponds to a single-serving side of one tablespoon, a third setting corresponds to a single-serving size of one and one half tablespoon, and the like. It should be appreciated that the present invention is not limited to the aforementioned volume measurements (e.g., tablespoons or increments thereof). Accordingly, by selecting one or more of the settings, the user can adjust the amount or volume of granular substance 102 selected and thus customize a strength of the resulting beverage.

As described above, the upper disc 140 can be rotated to vary the degree that L1 and L2 align or overlap and in doing so, the second outlet 146 receives varying amounts of the granular substance 102. The upper disc 140 can then be rotated in a counterclockwise direction as indicated by the arrow P back toward the first position, where the outlets 136 and 146 do not align or overlap. As rotation continues in the counterclockwise direction to a third position, the second outlet 146 at least partially aligns or overlaps the fourth outlet 186 in the ceiling 184 of the lower portion 180 (L2 at least partially overlaps L3) such that the fourth outlet 186 receives the amount or volume of the granular substance 102 within the second outlet 146. In this manner, the granular substance 102 passes from the second outlet 146 to the fourth outlet 186 and thus the spout 200 where it is dispensed from the dispenser 100. As described herein, the plurality of second positions allow a uniform or varying amount or volume of the granular substance 102 (e.g., coffee) to be dispensed from the dispenser to provide, for example, a weaker or stronger cup of brewed coffee.

In one embodiment, the rotation of the upper disc 140 in relation to the floor 132 of the storage compartment 130 cuts (e.g., with lip 136A), captures (e.g., within outlet 146) and transports an amount of the granular substance 102 (e.g., ground coffee), which may be a variable or predetermined amount or volume, from the storage compartment 130 and enables the passing of the amount of the granular substance 102 to and through the fourth outlet 186 and the spout 200. Thus, the dispenser 100 provides a manually-operated apparatus for measuring and dispensing a variable or predetermined amount of a granular substance (e.g., ground coffee) into the receptacle 220 (e.g., a single-serving coffee container or filter for use with a single-cup coffee brewing machine).

In one embodiment, the upper surface 140A of the upper disc 140 includes a portion of engagement 141. The portion of engagement 141 defines a flat surface 141A that is parallel to the upper surface 140A and is raised relative to the upper surface 140A, i.e., is located above the upper surface 140A. In one embodiment, the flat surface 141A of the portion of engagement 141 defines a region or area extending along the rotational diameter DR, having a width W5 and an arc length L4 bounded by points G and H.

Figure 5:
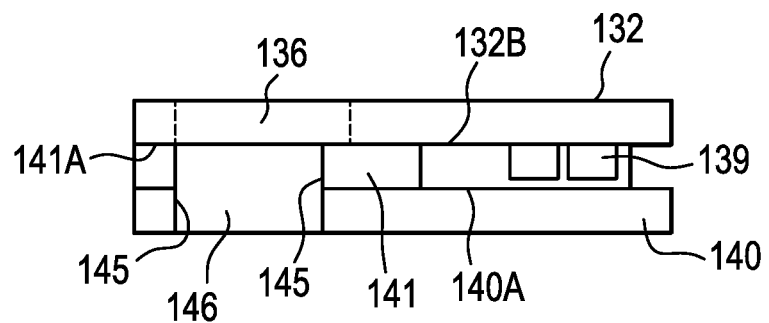
FIG. 5 is a cross-sectional view of a portion of the dispenser of FIG. 1, showing aspects of interaction between the floor of FIG. 2 and the upper disc of FIG. 3.

The length L4 of the portion of engagement 141 is selected so that the upper surface 141A engages the lower surface 132B of the floor 132, i.e., contacts or is close enough to prevent the granular substance 102 from entering between the lower surface 132B of the floor 132 and the upper disc 140 other than through the first outlet 136 and the second outlet 146. For example, as shown in FIG. 5, when the upper disc 140 is at the first or inactive position, the upper surface 140A contacts or is in sufficiently close proximity to prevent the granular substance falling between the floor 132 and the upper disc 140.

In one embodiment, the width W5 is greater than the width W3 of the second outlet 146 (i.e., W5>W3), or the width W5 is at least approximately equal to the width W3 of the second outlet 146 (i.e., W5≅W3). In one embodiment, the arc length L4 defined along the rotational diameter DR is at least as long as an arc length L5 defined on the floor 132 of the storage compartment 116 between a point I and a point J (FIG. 2). In this way, the portion of engagement 141 extends at least as far along the rotational diameter DR as a length corresponding to an extent of rotational movement of the second outlet 146 or a path followed by the second outlet 146 when the upper disc 140 is rotated. In one embodiment, the portion of engagement 141 is integrally formed with the upper disc 140. In one embodiment, the portion of engagement 141 is an insert fixedly assembled within the upper disc 140. In one embodiment the insert may be fabricated from a metal or metal alloy.

As noted above, FIG. 5 illustrates an embodiment of the relative configurations and positions of the floor 132 and the upper disc 140. As shown, a portion of the upper surface 140A is maintained in contact with or within a selected tolerance from the protrusions 139 extending from the lower surface 132B. A portion of the lower surface 132B that includes the first outlet 136 rides along the flat surface 141A of the portion of engagement 141 as the upper disc 140 is rotated. Likewise, portions of the upper surface 140A outside of the portion of engagement 141 contact or are maintained within a selected tolerance from the protrusions, and ride along the protrusions 139 as the upper disc 140 is rotated.

Figure 6:
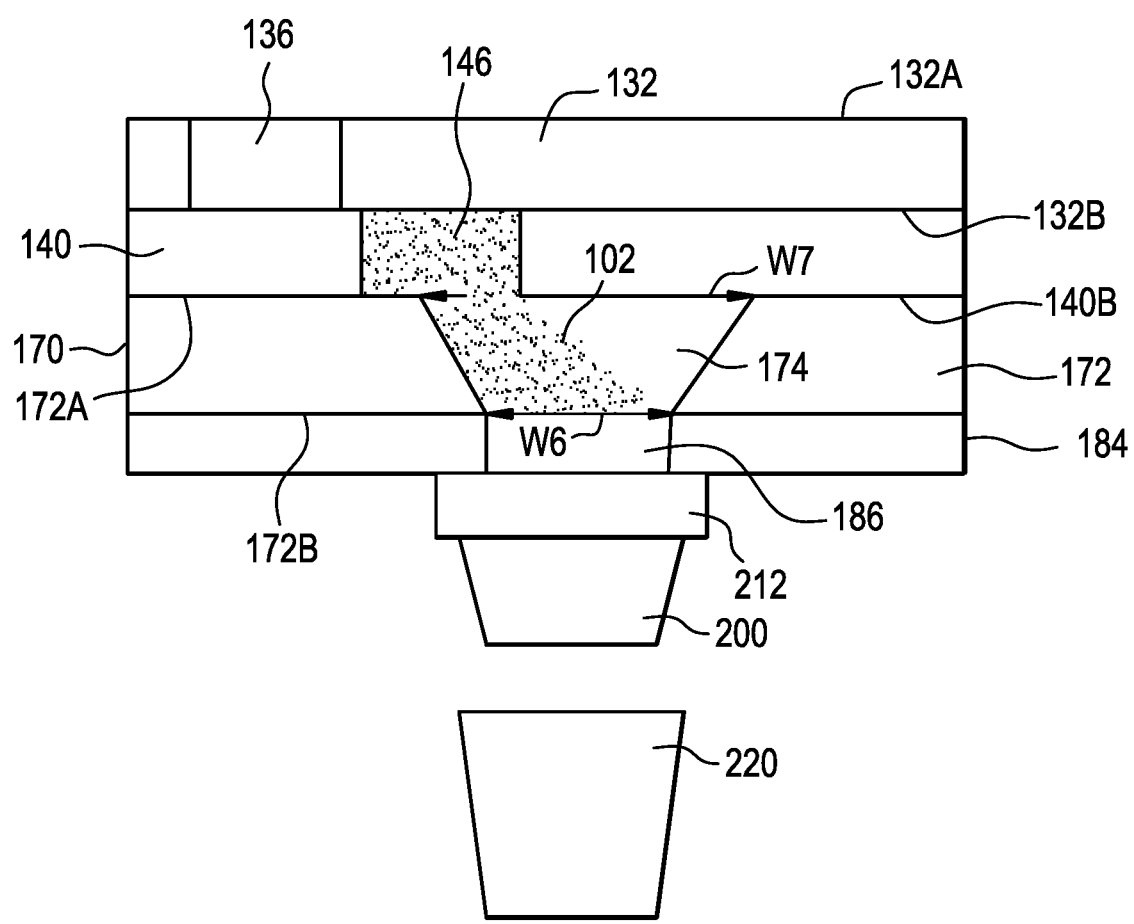
FIG. 6 is a cross-sectional view of a portion of the dispenser of FIG. 1, including an intermediate portion disposed between the upper disc of FIG. 3 and the ceiling of FIG. 4.

Referring to FIG. 6, in one embodiment, the dispenser 100 includes an intermediate portion 170 that is disposed between the upper disc 140 and the ceiling 184 of the lower portion 180. The intermediate portion 170 includes a body 172 having an internal funnel-shaped and/or tapered opening 174 that extends through the body from an upper surface 172A of the body 172 to a lower surface 172B of the body 172 of the intermediate portion 170. As shown in FIG. 6, when assembled between the upper disc 140 and the ceiling 184, the funnel-shaped and/or tapered opening 174 extends from the lower surface 140B of the upper disc 140 to the fourth outlet 186. As also shown in FIG. 6, the tapered opening 174 has a width W6 at the lower surface 172B which at least partially aligns with the fourth outlet 186. The width W6 of the opening 174 at the lower surface 172B is less than or at least substantially equal to the width W4 of the fourth outlet 186. The tapered opening 174 has a width W7 at the upper surface 172A that is greater than the width W3 and/or arc length L2 of the second outlet 146. The upper disc 140 can be rotated to at least partially align the second outlet 146 of the upper disc 140 with the opening 174 of the intermediate portion 170, which causes the granular substance 102 to pass from the second outlet 146 to the opening 174 and the fourth outlet 186, and thereafter pass through the spout 200 into a receptacle 220. The intermediate portion 170 thereby provides a conduit between the upper disc 140 and the ceiling 184 that permits the granular substance 102 to be dispensed from the second outlet 146 even when there is no overlap between the second outlet 146 of the upper disc 140 and the fourth outlet 186 of the ceiling 184.

In one embodiment, the dispenser 100 includes two manually rotatable discs positioned proximate to one another between the storage compartment 130 and the lower portion 180 of the dispenser 100. The discs can be operated cooperatively to dispense a granular substance 102 such as coffee into a receptacle 220 such as a coffee pod or other single serve container.

Figure 7:
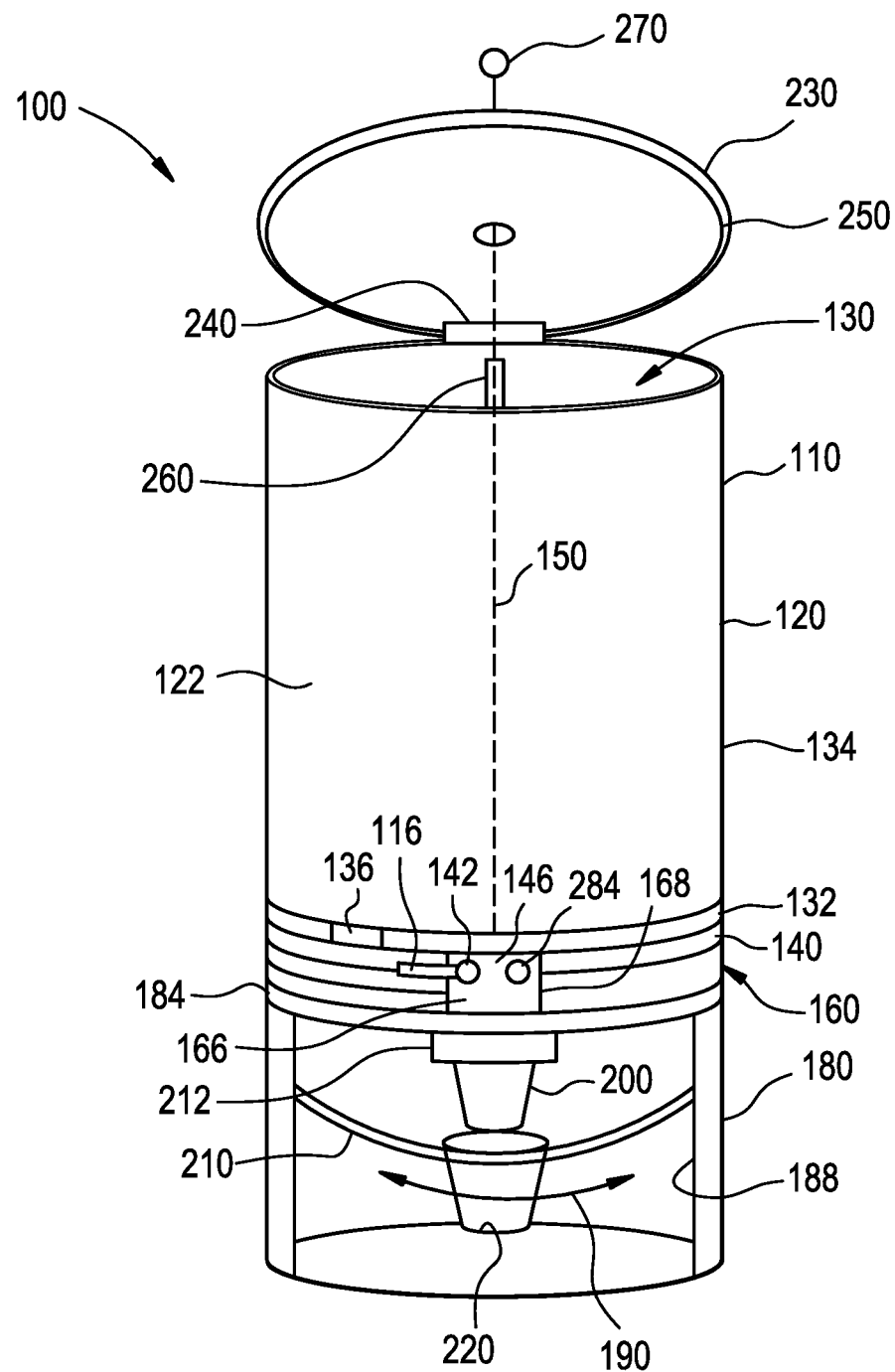
FIG. 7 is a front elevation view of another embodiment of a manually-operated dispenser that stores, measures and dispenses an amount or volume of a granular substance in accordance with the present invention, which includes an upper disc and a lower disc.

Referring to FIG. 7, in one embodiment, the dispenser 100 includes the upper disc 140 and a lower disc 160 positioned between the upper disc 140 and the ceiling 184 of the lower portion 180. The upper disc 140 and the lower disc 160 are manually rotatable about the rotational axis 150. For example, the upper disc 140 is mounted on the spindle 260 via the central aperture 148, and the lower disc is mounted on the spindle 260 via a central aperture 162 and rotatable about the spindle 260. In one embodiment, the upper disc 140 includes the first tab 142 and the lower disc 160 includes a second tab 164.

Figure 8:
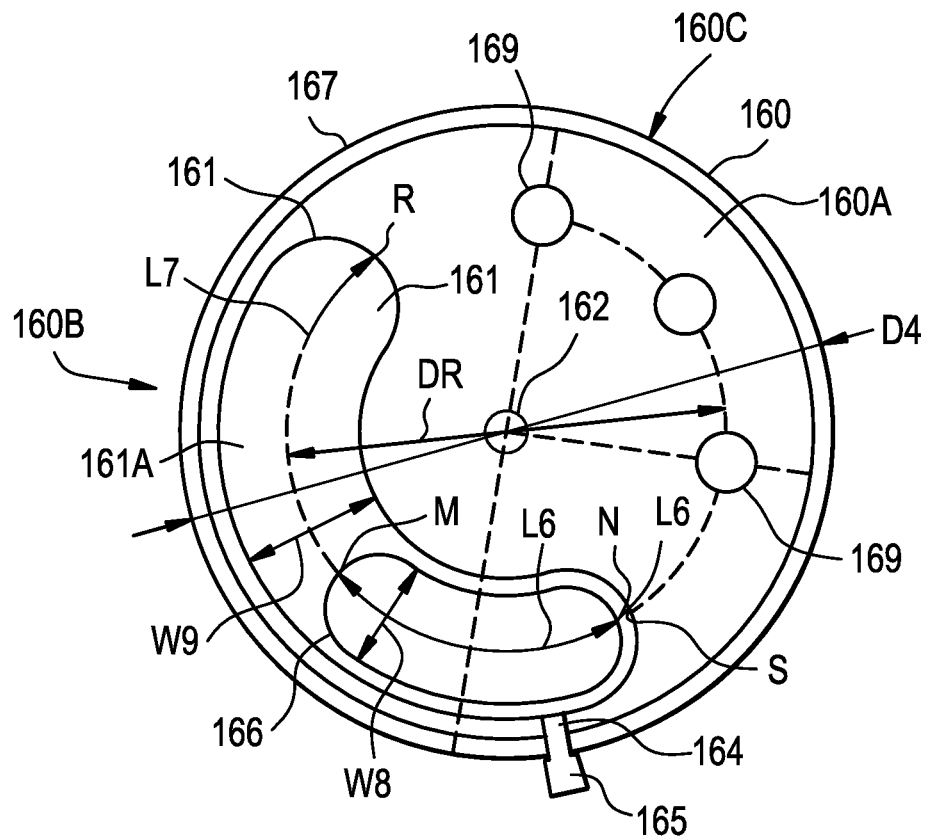
FIG. 8 is a top view of the lower disc of the dispenser of FIG. 7.

Referring to FIG. 8, an embodiment of the lower disc 160 includes an upper surface 160A and a lower surface 160B (shown in FIG. 9) opposite the upper surface 160A. The lower disc 160 includes features that correspond to the features of the upper disc 140 and/or the ceiling 184 of the lower portion 180. The upper disc 140 and the lower disc 160 are configured so that the lower surface 140B of the upper disc 140 is disposed proximate to the upper surface 160A of the lower disc 160, and so that the lower surface 160B of the lower disc 160 is disposed proximate to the ceiling 184 of the lower portion 180.

The lower disc 160 includes an aperture or third outlet 166 extending through the lower disc 160 from the upper surface 160A to the lower surface 160B of the lower disc 160. In one embodiment, as shown in FIG. 7, the upper disc 140 and the lower disc 160 are configured so that the granular substance 102 can pass directly from the third outlet 166 to the fourth outlet 186 of the lower portion 180. In one embodiment, the intermediate portion 170 is disposed between the lower disc 160 and the ceiling 184 of the lower portion to facilitate transfer of the granular substance 102 between the third outlet 166 to the fourth outlet 186, as described above.

As shown in FIG. 8, the upper surface 160A of the lower disc 160 defines has a circular configuration 160C of a diameter D4. The lower disc 160 also includes the third outlet 166, which receives a predetermined or variable amount of the granular substance from the storage compartment 130 via the first outlet 136 and the second outlet 146 of the upper disc 140, and transports the granular substance to the fourth outlet 186 and the spout 200. In one embodiment, the lower disc 160 is rotatable via the second tab 162, which includes an arm 165.

In one embodiment, the third outlet 166 has an ovular shape that corresponds with the circular configuration 160C. For example, the third outlet 166 has an arcuate shape that includes an elongated portion having a width W8, and a length L6 (an arc length) defined along the rotational diameter DR. The length L6 is defined by end points M and N.

The third outlet 166 may have at least approximately the same size and shape as the first outlet 136 of the storage compartment 130 and/or the second outlet 146 of the upper disc 140, or may have a different size and/or shape. For example, the width W8 is greater than the width W3 of the second outlet 146 (i.e., W8>W3), or the width W8 is at least approximately equal to the width W3 of the second outlet 146 (i.e., W8≅W3). The arc length L6 may be greater than the arc length L2 of the second outlet 146 (i.e., L6>L2), or may be at least approximately equal to the arc length L2 of the second outlet 146 (i.e., L6≅L2).

In one embodiment, the fourth outlet 186 and/or the top of the spout 200 are sized and shaped correspondingly to the third outlet 166. For example, at least the fourth outlet 186 has a diameter that is approximately equal to or greater than the width W8 of the third outlet 166 of the lower disc 160. In one embodiment, the length L3 of the fourth outlet 186 is less than or at least approximately equal to the length L6 of the third outlet 166, or is greater than the length L6 of the third outlet 166.

In one embodiment, the third outlet 166 of the lower disc 160 is sized to retain a predetermined amount of the ground substance that is received via the first outlet 136 and the second outlet 146. The amount of the granular substance 102 can be retained and transported by the third outlet 166 during rotation of the lower disc 160 to move the amount of the granular substance 102 over the spout 200 of the dispenser 100. For example, with reference to FIGS. 7, 8 and 9, the third outlet 166 has one or more side walls 168 that define a cavity having a selected volume. The volume of the third outlet 166 is bounded by the side walls 168, the lower surface 140B of the upper disc 140 and an upper surface 184A of the ceiling 184. It is noted that, although the side walls 145 of the second outlet 146 and the side walls 168 of the third outlet 166 are shown as generally vertical, they are not so limited and can form any profile, such as a tapered or curved profile formed by tapered or curved walls.

The selected volume may be, for example, the volume of a maximum amount of the granular substance, such as a number of tablespoons (or constituents thereof) corresponding to a selected strength of brewed coffee.

In one embodiment, the lower disc 160 includes one or more protrusions 169 extending upwardly from the top face 160A. During rotation of the upper disc 140, the upper disc 140 traverses or rides on or over the protrusions 169.

In one embodiment, the protrusions 169 are positioned along the central rotational diameter DR. In one embodiment, the protrusions 169 are integrally formed with the lower disc 160. In one embodiment, the protrusions 169 are fixedly attached to the upper surface 160A, such as for example, as one or more guide pads fixedly attached to the lower disc 160.

In one embodiment, the lower disc 160 includes a portion of engagement 161, which defines a flat surface 161A that is parallel to the upper surface 160A of the lower disc 160 and is raised relative to the upper surface 160, i.e., is located above the upper surface 160A.

In one embodiment, the portion of engagement 161 and the flat surface 161A define a region or area that extends along the rotational diameter DR, and that has a width W9 and an arc length L7 bounded by points between point R and a point S on the rotational diameter DR. The length L7 of the portion of engagement 161 is selected so that the upper surface 161A engages the lower surface 140B, i.e., contacts or is close enough to the lower surface 140B to prevent the granular substance 102 from entering between the lower surface 140B of the upper disc 140 and the lower disc 160 other than through the second outlet 146 and the third outlet 166.

As shown in FIG. 8, in one embodiment, the width W9 is greater than the width W8 of the third outlet 166 (i.e., W9>W8), or the width W9 is at least approximately equal to the width W8 (i.e., W9≅W8).

In one embodiment, the portion of engagement 161 extends at least as far along the rotational diameter DR as a length corresponding to an extent of rotational movement of the third outlet 166 or a path followed by the third outlet 166 when the lower disc 160 is rotated. For example, the arc length L7 of the portion of engagement 161 extends at least as far as twice the arc length L2 of the second outlet 146 to accommodate the rotation therethrough of the upper disc 140 over the lower disc 170.

In one embodiment, the portion of engagement 161 is integrally formed with the lower disc 160. In one embodiment, the portion of engagement 161 is an insert fixedly assembled within the lower disc 160. In one embodiment the insert may be fabricated from a metal or metal alloy.

Figure 9:
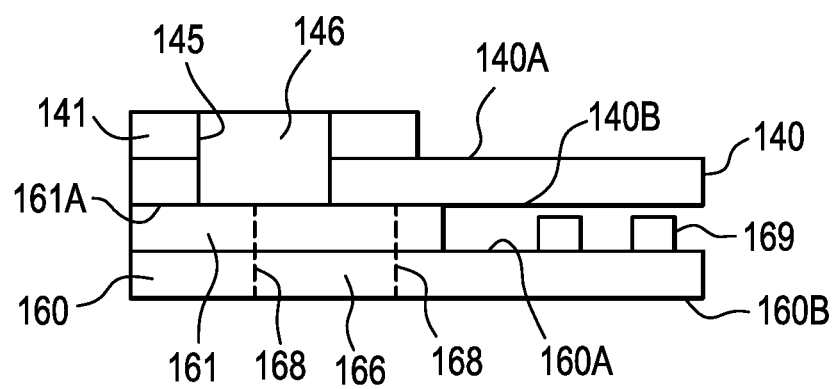
FIG. 9 is a cross-sectional view of a portion of the dispenser of FIG. 7, showing aspects of interaction between the upper disc and the lower disc of FIG. 7.

FIG. 9 illustrates an embodiment of the relative configurations and positions of the upper disc 140 and the lower disc 160. As shown, a portion of the lower surface 140B of the upper disc 140 rests on or is maintained in contact with or within a selected tolerance from the protrusions 169 extending from the upper surface 160A of the lower disc 160. A portion of the lower surface 140B that includes the second outlet 146 rides along the flat surface 161A of the portion of engagement 161 as the upper disc 140 and/or the lower disc 160 are rotated. In one embodiment, the portion of engagement 161 is raised by a selected distance so that the surface 161A and the protrusions extend upwardly by at least approximately the same distance from the upper surface 160A of the lower disc 160.

In one embodiment, the upper disc 140 defines a peripheral lip 147 (shown in FIG. 3) extending upwardly and radially outwardly to provide a seal between the upper disc 140 and the floor 132 of the storage compartment 130. In one embodiment, the lower disc 160 defines a peripheral lip 167 (shown in FIG. 8) extending upwardly and radially outwardly to provide a seal between and the upper disc 140 and the lower disc 160.

Referring again to FIG. 7, in one embodiment, the upper disc 140 is rotated in relation to the storage compartment 130 and the lower disc 160. In this embodiment, the lower disc 160 is rotationally fixed. The upper disc 140 can be rotated, for example, by operation of the spindle 260 extending through the components of the dispenser 100 or by operation of a set of tabs, such as the tab 142 and a tab 284. The rotation of the upper disc 140 in relation to the lower disc 160 provides for the dispensing of an amount of the granular substance 102 to and through the spout 200. For example, the upper disc 140 is fixedly mounted to the spindle 260 such that rotation of the spindle 260, for example by rotating the knob 270 atop the spindle 260, causes the upper disc 140 to rotate between a first or inactive position to one or more second or active position, thereby providing for the release of the amount of the granular substance 102 through the spout 220.

In one embodiment, the spindle 260 extends through the central aperture 138 of the floor 132 of the storage compartment 130 and extends through the central aperture 162 of the lower disc 160 in a slip-fit configuration through which the passing of the granular substance 102 (e.g., coffee grounds) is substantially obstructed by a correspondingly sized and shaped gasket.

Figure 10:
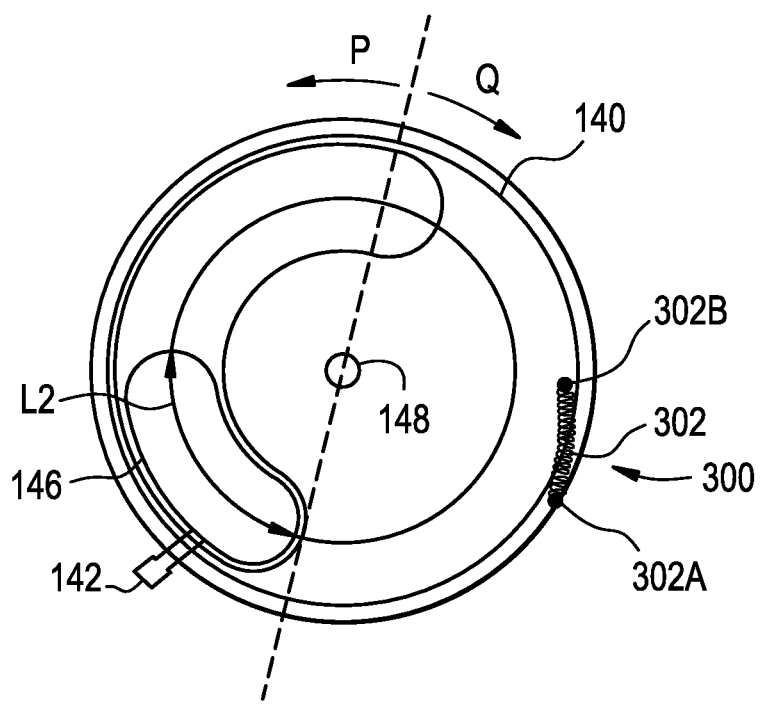
FIG. 10 is a top view of the upper disc of FIG. 7 in a first or inactive position.

An example of the upper disc 140 in a first position is shown in FIG. 10, in which the second outlet 146 does not align with and does not overlap at least the fourth outlet 186 of the ceiling 184 of the lower portion 180, i.e., no portion of L2 and L3 overlaps. In the first position, the second outlet 166 may or may not overlap the first outlet 136 of the storage compartment 130.

Figure 11:
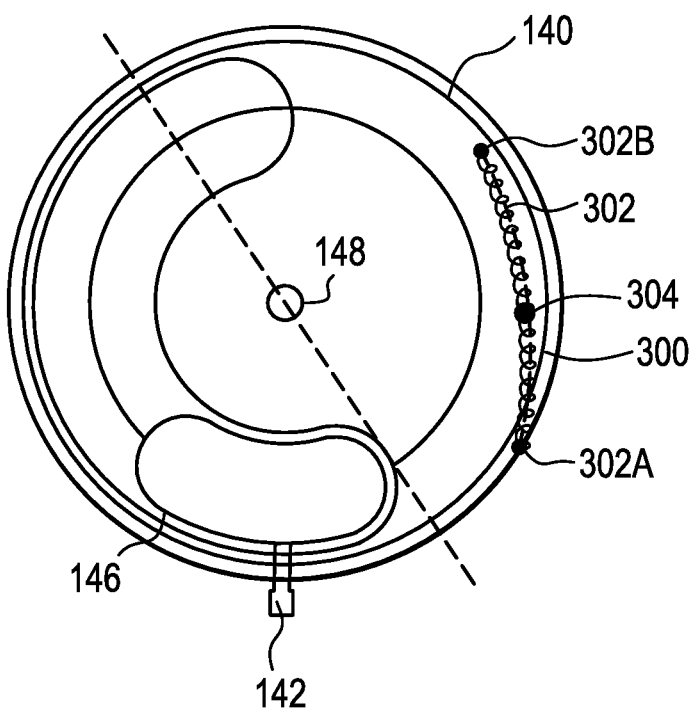
FIG. 11 is a top view of the upper disc of FIG. 7 in a second or active position.

An example of the upper disc 140 in a second position is shown in FIG. 11. In the second position, the second outlet 146 of the upper disc 140 at least partially overlaps the fourth outlet 186 to permit the granulated substance 102 to pass from the second outlet 146 and through the fourth outlet 186 to dispense the granular substance 102 to a container.

In one embodiment, the dispenser 100 as shown in FIG. 7 is operated to rotate the upper disc 140 to and from the first position using the tab 142. The upper disc 140, in one embodiment, is rotated from the first position as shown in FIG. 10 to the second position as shown in FIG. 11, by operation of the set of tabs 142 and 284. For example, the tab 142 extends through a slot 116 formed in the housing 110 of the dispenser 100. The first tab 142 is fixedly attached to the rotatable upper disc 140, and the second tab 164 is fixedly attached to the fixed-position lower disc 160. The upper disc 140 is rotated from the first position in which the second outlet 146 overlaps the first outlet 136 to receive an amount of the granular substance, to the second position in which the second outlet 146 overlaps the third outlet 166 and the fourth outlet 186 by bringing or pressing the set of tabs 142 and 284 toward each other.

In one embodiment, a tab-return assembly 300 provides for returning the upper disc 140 to the first position from the second position. In one embodiment, a tension spring 302 is affixed at a first end 302A to the housing 110 at a position within the storage compartment 130 and proximate the upper surface 140A of the upper disc 140. The tension spring 302 is affixed at a second end 302B to the upper surface 140A of the upper disc 140. In the first position, the tension spring 302 maintains a nominal tension. When the first tab 142 is moved toward the second tab 284 (i.e., toward the second position shown in FIG. 11), and the upper disc 140 is correspondingly rotated in the direction indicated by the arrow P, the tension spring 302 is extended thereby increasing the tension thereof. After the first tab 142 is brought into position proximate the second tab 284 and an amount of the granular substance 102 has been dispensed, the tabs 142 and 284 are released and the tab 142 and the upper disc 140 are biased to return to the first position whereby the upper disc 140 is correspondingly rotated in the direction indicated by the arrow Q. In one embodiment, the tab-return assembly 302 includes a cushion stop 304 or other mechanism to softly receive the second end 302B of the tension spring 302.

Figure 12:
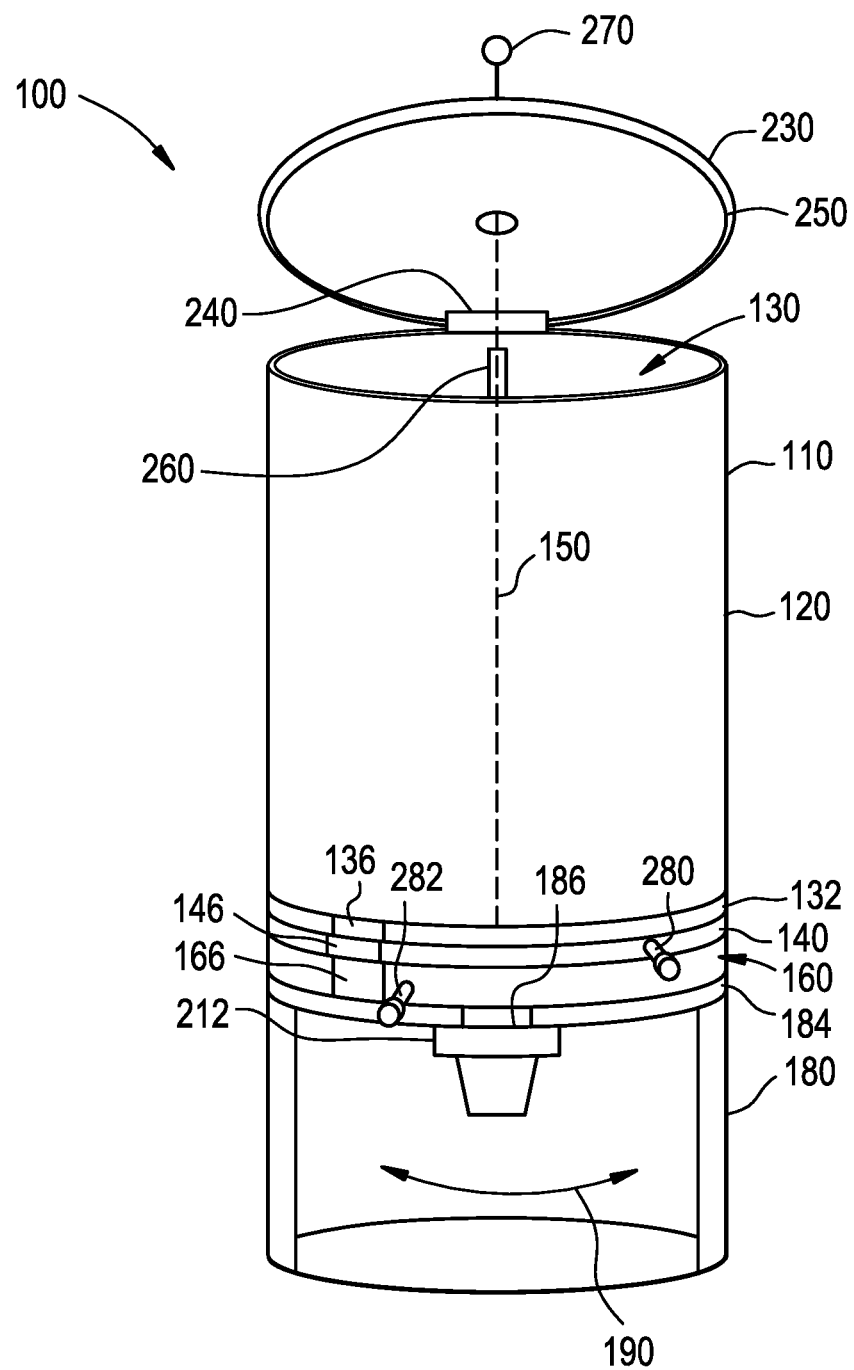
FIG. 12 is a front elevation view of another embodiment of a manually-operated dispenser that stores, measures and dispenses an amount or volume of a granular substance in accordance with the present invention, which includes a storage compartment, an upper disc and a lower disc.

FIG. 12 shows an embodiment of the dispenser 100 in which both the upper disc 140 and the lower disc 160 are manually rotatable, and in which the upper disc 140 and the lower disc 160 are independently rotatable. The upper disc 140, in this embodiment has a tab 280 to enable manual rotation of the upper disc 140, and the lower disc 160 has a tab 282 to enable manual rotation of the lower disc 160. In one embodiment, the upper disc 140 has the configuration shown in FIG. 3, and the lower disc 160 has the configuration shown in FIG. 8, although the upper and lower discs are not limited to such configurations. In one embodiment, a mechanical stop such as a slot, protrusion or sleeve is provided to restrict rotation by limiting the rotational extent by which the discs can be rotated.

Figure 13:
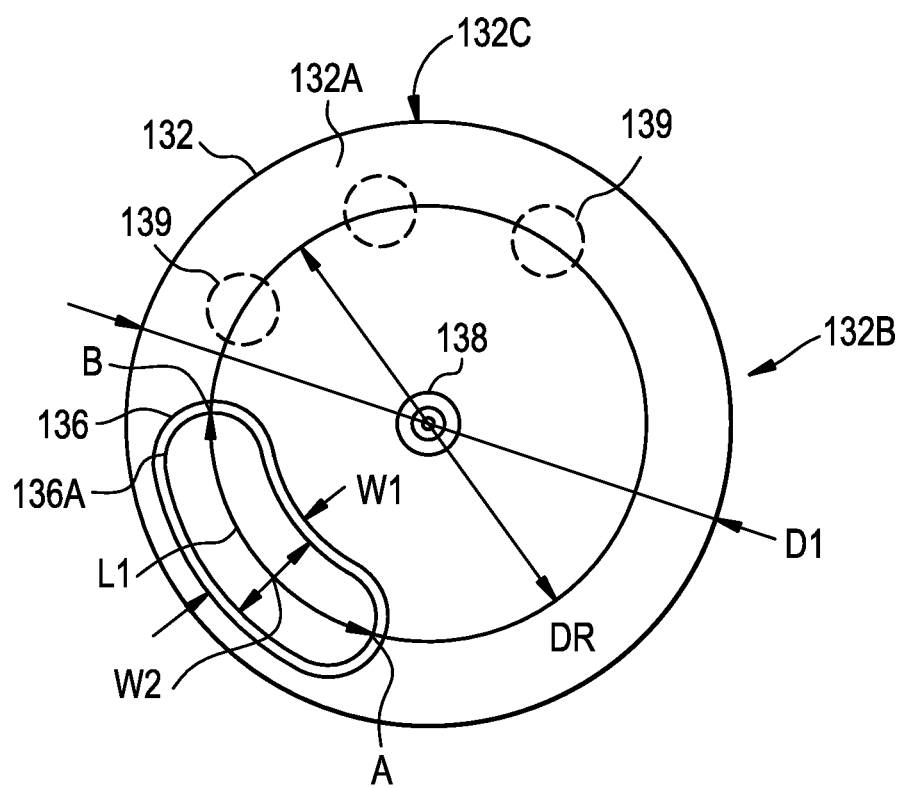
FIG. 13 is a top view of a floor of a storage compartment of the dispenser of FIG. 1.
Figure 14:
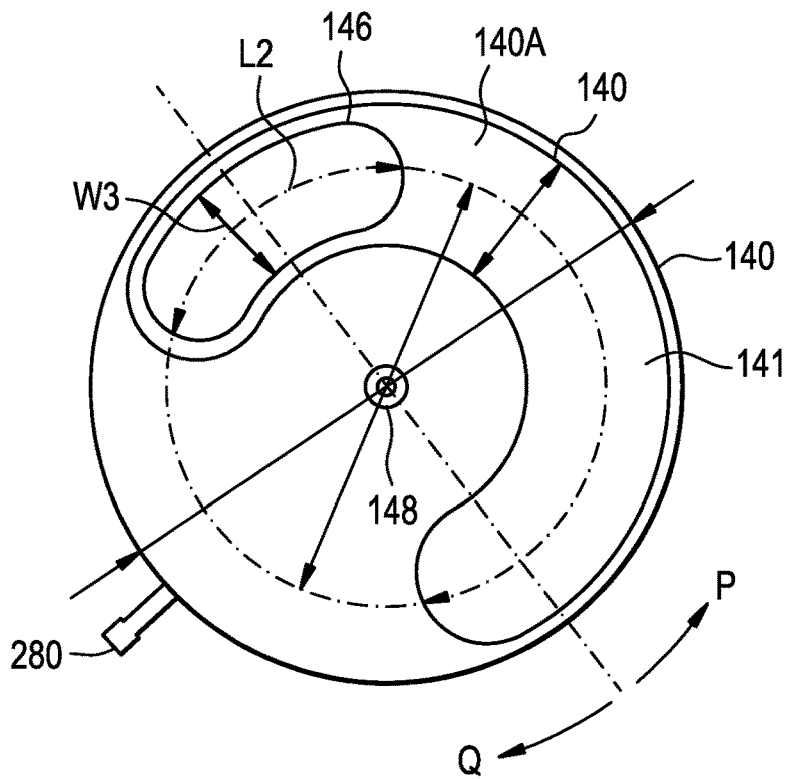
FIG. 14 is a top view of the upper disc of FIG. 12 in a first inactive position.
Figure 15:
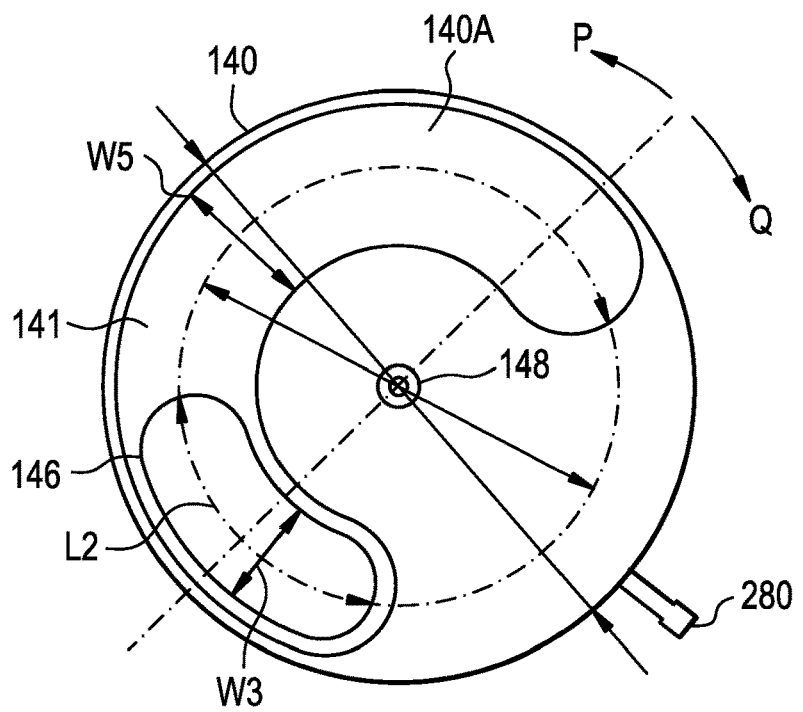
FIG. 15 is a top view of the upper disc of FIG. 12 in a second active position.

Operation of the dispenser 100 of FIG. 12 according to one embodiment is discussed with respect to FIGS. 13-17. FIG. 13 shows the floor 132 of the storage compartment 130 having the first outlet 136. FIG. 14 shows the upper disc 140 in a first inactive position in which the second outlet 146 does not overlap the first outlet 136 of the storage compartment 130 or the fourth outlet 186 of the ceiling 184, and thereby the granular substance is prevented from entering the second outlet. FIG. 15 shows the upper disc 140 in a second active position in which the second outlet 146 at least partially overlaps or aligns with the fourth outlet 186 of the ceiling 182. In the first active position, the granular substance 102 is permitted to pass through the first outlet 186 into the second outlet 146. The upper disc 140 is moved from the first inactive position to the second active position by rotating the upper disc 140 in a counter-clockwise direction as shown by arrow P.

Figure 16:
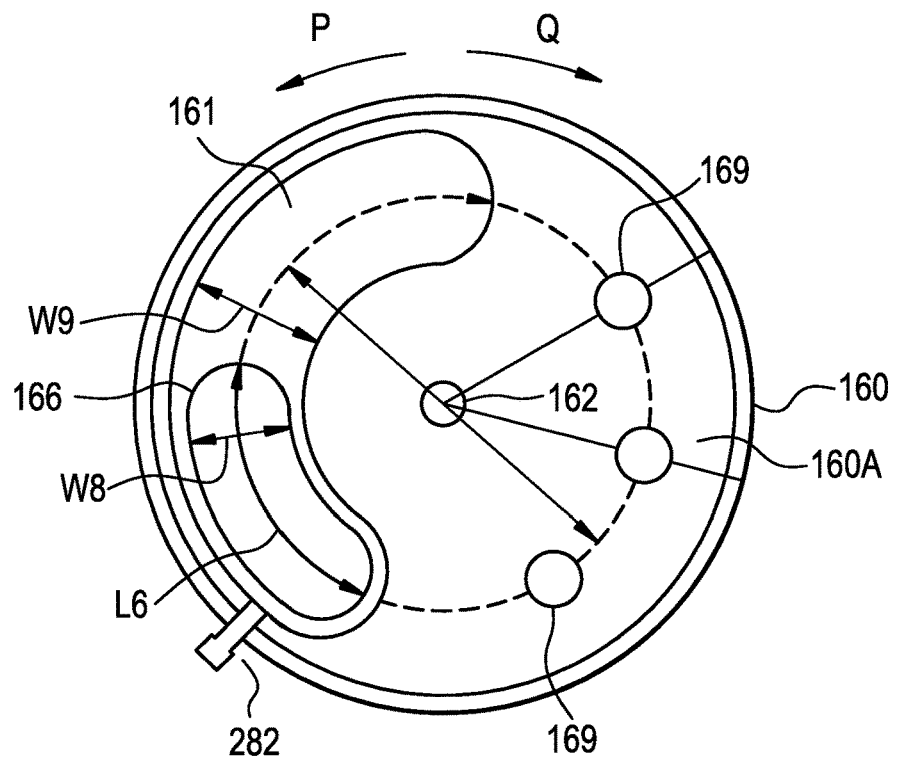
FIG. 16 is a top view of the lower disc of FIG. 12 in a third inactive position.
Figure 17:
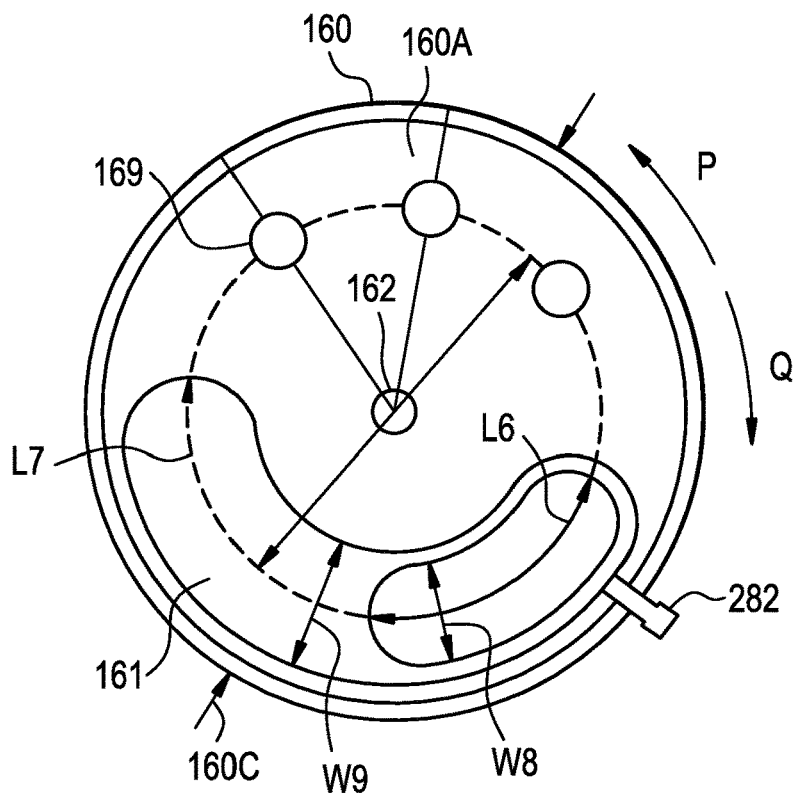
FIG. 17 is a top view of the lower disc of FIG. 12 in a fourth active position.

FIG. 16 shows the lower disc 160 in a third inactive position in which the third outlet 166 of the lower disc 160 does not align with or overlap the fourth outlet 186 of the ceiling 184. FIG. 17 shows the lower disc 160 in a fourth active position in which the third outlet 166 of the lower disc 160 at least partially overlaps the fourth outlet 186 of the ceiling and the spout 200. In the fourth active position, the granular substance 102 is permitted to pass from the third outlet 166 into and through the fourth outlet 186 and the spout 200 to dispense the granular substance into a container. The lower disc 160 is moved from the third inactive position to the fourth active position by rotating the lower disc 160 in the counter-clockwise direction as shown by arrow P.

In an initial operating state, at least the upper disc 146 is in the first inactive position, so that the granular substance 102 cannot exit the storage compartment 130. The lower disc 160 may also be in the second inactive position.

In one embodiment, to operate the dispenser 100, the upper disc 140 is rotated via the tab 280 about the axis of rotation 150, e.g., in a counter-clockwise direction shown by the arrow P, from the first inactive position to the first active position, and the lower disc 160 is rotated to or maintained at the second inactive position, so that the first outlet 136, the second outlet 146 and the third outlet 166 at least partially overlap to permit an amount of the granular substance to pass through the first outlet 136 and the second outlet 146 and into the third outlet 166, where the amount of the granular substance 102 is retained in the outlet 166. In one embodiment, the upper disc 140 and the lower disc 160 are positioned so that the outlets 136, 146 and 166 completely overlap so as to receive a maximum amount of the granular substance in the third outlet 166. In one embodiment, the lower disc 160 is moved or positioned to one or more intermediate positions between the second inactive and the second active position. Each intermediate position corresponds to an extent or degree of overlap between the second outlet 146 and the third outlet 166, (i.e., the amount of overlap between lengths L2 and L5). One or more intermediate positions may be denoted by indicators such as the indicia 114 (FIG. 1), to permit a user to select different amounts of the granular substance 102 for dispensing.

Next, the upper disc 146 is optionally rotated to the first inactive position, and the lower disc 160 is rotated from the second inactive position (or one of the intermediate positions) to the second active position, whereby the third outlet 166 traverses part of the rotational diameter DR to transport the amount of the granular substance 102 to a position above the fourth outlet 186 of the ceiling 182. When the lower disc 160 is in the second active position, the entirety (or a portion) of the third outlet 166 passes over and/or is positioned above the fourth outlet 186 to permit the amount of the granular substance to pass through the spout 200 and into the receptacle 220 (e.g., a filter or single serve coffee pod).

Figure 18:
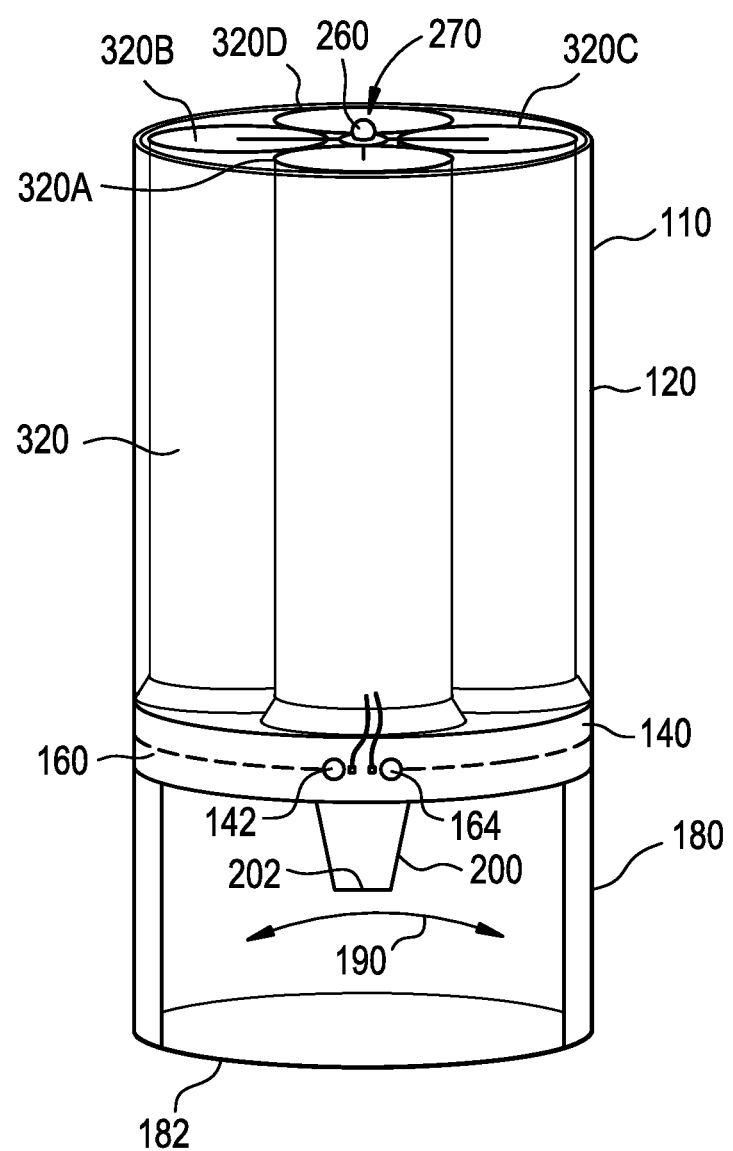
FIG. 18 is a front elevation view of another embodiment of a manually-operated dispenser that stores, measures and dispenses an amount or volume of a granular substance in accordance with the present invention, which includes a storage compartment housing a plurality of storage containers.

In one embodiment and as shown in FIG. 18, the storage compartment 130 houses a plurality of storage containers 320, such as for example four storage containers 320A, 320B, 320C and 320D. The storage containers 320 are mounted on the spindle 260 or otherwise mounted to permit rotation about the axis of rotation 150. For example, the plurality of storage containers 320 are mounted on the spindle 260. The spindle 260 and the storage containers 320 may be rotatable via the knob 270 or other mechanism attached thereto for selectively rotating any one of the plurality of storage containers 320 to a position above the first outlet 136 or the fourth outlet 186 of the ceiling 182. In one embodiment, the plurality of storage containers 320 each hold a different type of substance, e.g., a different blend of coffee for selection by a user of the dispenser 100.

In one embodiment, the dispenser 100 includes a breaker 310 installed within the storage compartment 130 and configured for rotational movement therein to, e.g., loosen clumped or bridged coffee grounds or other granular substances. The breaker 310 may be fixedly attached to the upper disc 140 and extend upwardly into the storage compartment 130, so that rotation of the upper disc 140 causes the breaker 310 to move along a semi-circular path and through the granular substance stored therein, to remove or prevent clumping of the granular substance 102.

Figure 19:
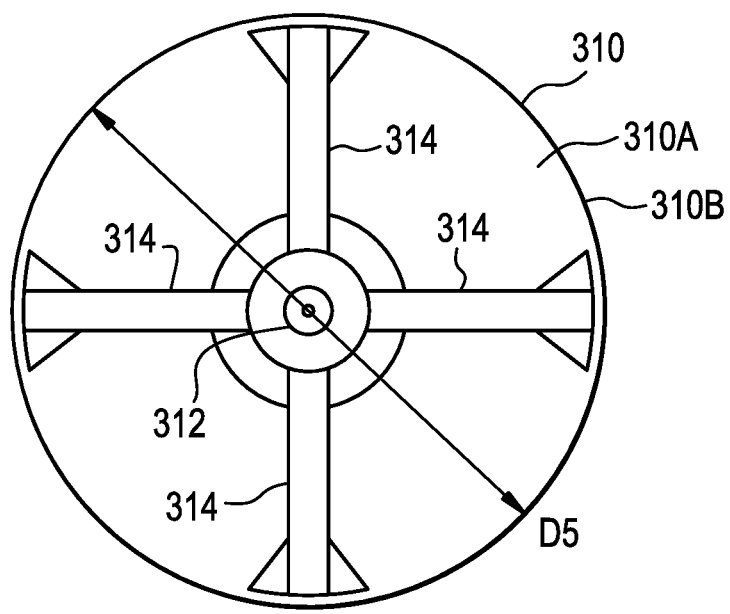
FIG. 19 is a top view of a breaker component of the dispenser of FIG. 1, FIG. 7 and/or FIG. 12.

Referring to FIG. 19, in one embodiment, the breaker 310 defines a top face 310A and a circular configuration 310B having a diameter D5 and includes a central aperture 312 for receiving the spindle 260 therethrough. The tension on the upper and lower discs 140 and 160 and the breaker 310 can be selectively adjustable by the tightening and loosening of the tension on the spindle 260, such as for example by tightening and loosening the knob 270 atop the spindle. In one embodiment, the breaker 310 includes one or more cross members 314 which provide leverage points to manually rotate the breaker 300 when in a loosened configuration to accommodate the rotational movement thereof.

In one embodiment, diameter D2 of the upper disc 140, the diameter D4 of the lower disc 160 and the diameter D5 of the breaker 310 are at least approximately equal and are less than diameter D1 of the floor 132 (i.e., D2≅D4≅D5; and D1>D2, D1>D4, and D1>D5).

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above-detailed description, but that the invention will include all embodiments falling within the scope of the appended claims.

What is claimed is:

1. A dispenser for measuring and dispensing a granular substance, the dispenser comprising:
    a housing having an upper portion disposed upon a lower portion, the upper portion including a storage compartment having a floor and a sidewall defining an interior volume configured to retain the granular substance therein, the lower portion including a support platform and a spout;
    a first outlet extending through the floor of the storage compartment, gravity acting to cause the granular substance in the storage compartment to pass out of the interior volume through the first outlet;
    an upper disc disposed below the floor of the storage compartment and independently rotatable about a rotational axis, the upper disc having a second outlet extending therethrough and having a first tab that is engageable to manually rotate the upper disc between a first position where the second outlet of the upper disc does not overlap the first outlet of the floor to a second position where the second outlet at least partially overlaps the first outlet, wherein in the first position no amount of the granular substance passes through the first outlet and in the second position an amount of the granular substance is allowed to pass through the first outlet of the floor and into the second outlet of the upper disc;
    a lower disc disposed between the upper disc and the lower portion and independently rotatable about the rotational axis, the lower disc having a third outlet extending therethrough the lower disc having a second tab that is engageable to manually rotate the lower disc between a third position where the third outlet does not overlap the second outlet toward a fourth position through one or more intermediate positions where the one or more intermediate positions correspond increasingly to an extent of overlap between the second outlet and the third outlet, wherein in the one or more intermediate positions an increasing amount of the granular substance relative to the extent of overlap is allowed to pass through the second outlet of the upper disc and into the third outlet of the lower disc, and in the fourth position a maximum amount of the granular substance is allowed to pass through the second outlet and into the third outlet of the lower disc, wherein at least one of the increasing amounts and the maximum amount selectively defines a single-serving size of the granular substance; and
    a fourth outlet disposed in a ceiling of the lower portion; wherein:
    when the upper disc is rotated from the first position to the second position, and the lower disc is disposed in at least one of the one or more intermediate positions and the fourth position, the first outlet, the second outlet and the third outlet at least partially overlap to permit the single-serving size of the granular substance to pass through the first outlet, the second outlet and into the third outlet where the single-serving size of the granular substance is retained in the third outlet; and
    subsequently, when the lower disc is rotated from the at least one of the one or more intermediate positions and the fourth position, the third outlet transport the amount transports the single-serving size of the granular substance retained in the third outlet to a fifth position above the fourth outlet and in alignment with the spout dispensing the single-serving size of the granular substance into a receptacle placed below the spout.

2. The dispenser of claim 1, wherein the third outlet includes one or more side walls that define a cavity having a volume, the cavity is configured to receive and dispense the single-serving size of the granular substance.

3. The dispenser of claim 1, wherein the extent of overlap between the second outlet of the upper disc and the third outlet of the lower disc corresponds to a plurality of amounts or volumes of selectively defined single-serving sizes of the granular substance.

4. The dispenser of claim 1, further comprising at least one mechanical stop configured to:
    restrict rotation of the upper disc between the first position and the second position; and
    restrict rotation of the lower disc between a position in which the third outlet does not overlap the spout, and the fifth position.

5. The dispenser of claim 1, further comprising a spring configured to bias at least the upper disc toward the first position.

6. The dispenser of claim 1, further comprising a lip formed at an edge of the first outlet and extending downwardly from the first outlet.

7. The dispenser of claim 1, wherein the storage compartment includes a plurality of storage containers, each of the plurality of storage containers being manually rotatable between a first position in which a storage container is disposed away from the first outlet and a second position in which the storage container is disposed directly over the first outlet to permit the granular substance to pass from the storage container through the first outlet.

8. The dispenser of claim 1, wherein the upper disc and the lower disc are mounted on and rotatable about a central spindle disposed in the housing.

9. The dispenser of claim 1, further comprising a support structure configured to hold a receptacle directly under the spout to capture the dispensed granular sub stance.

10. The dispenser of claim 1, further comprising:
    indicia disposed on an exterior surface of the housing proximate the second tab of the lower disc, the indicia indicative of each of the one or more intermediate positions and the fourth position and the corresponding single-serving size of the granular substance passed to the third outlet.

11. The dispenser of claim 1, further comprising:
    an intermediate portion disposed between the lower disc and the ceiling of the lower portion of the housing, the intermediate portion has a body including an upper surface, a lower surface and an internal funnel-shaped cavity extending from the upper surface to the lower surface, a width of the funnel-shaped cavity proximate the ceiling is equal to a width of the fourth outlet.

12. The dispenser of claim 1, wherein the floor of the storage compartment has a circular configuration and a first diameter, and wherein the first outlet has an arcuate shape corresponding to the circular configuration of the floor, the first outlet including a first elongated portion having a first width and a first arc length defined along a rotational diameter, the rotational diameter being less than the first diameter of the floor.

13. The dispenser of claim 12, wherein the second outlet of the upper disc has an arcuate shape corresponding to the first outlet of the floor, the second outlet having a second elongated portion of a second width and a second arc length defined along the rotational diameter.

14. The dispenser of claim 13, wherein the third outlet of the lower disc has an arcuate shape corresponding to the second outlet of the upper disc, the third outlet having a third elongated portion of a third width and a third arc defined along the rotational diameter.

15. The dispenser of claim 14, wherein the fourth outlet of the ceiling of the lower portion has an arcuate shape corresponding to the third outlet, the fourth outlet having a fourth elongated portion of a fourth width and a fourth arc length defined along the rotational diameter.

16. The dispenser of claim 1, further comprising:
a breaker disposed within the storage compartment and rotatably about the rotation axis, the breaker configured to loosen the granular substance within the storage compartment to facilitate passage through the first outlet.

17. A method of measuring and dispensing a granular substance, the method comprising:
disposing the granular substance in a storage compartment of a dispenser, the storage compartment having a floor and a sidewall defining an interior volume configured to retain the granular substance, the storage compartment located in an upper portion of a housing, the housing including the upper portion disposed upon a lower portion, the lower portion including a support platform and a spout, the storage compartment having a first outlet extending through the floor of the storage compartment, gravity acting to cause the granular substance in the storage compartment to pass out of the interior volume through the first outlet, the dispenser including an upper disc disposed below the floor of the storage compartment and a lower disc disposed between the upper disc and the lower portion, the upper disc having a second outlet extending therethrough, the lower disc having a third outlet extending therethrough, the spout having a fourth outlet extending therethrough, the upper disc and the lower disc each independently rotatable about a rotational axis;
selectively defining a single-serving size of the granular substance by manually rotating the lower disc to one of a plurality of positions, each of the plurality of positions corresponding increasingly to an extent of overlap between the second outlet of the upper disc and a third outlet of the lower disc;
manually rotating the upper disc so that the second outlet of the upper disc aligns with the first outlet of the floor of the storage compartment to permit the single-serving size of the granular substance to pass through the first outlet of the floor, the second outlet of the upper disc and into the third outlet of the lower disc where the single-serving size is retained; and
manually rotating the lower disc to transport the single-serving size of the granular substance retained in the third outlet so that the third outlet aligns with the fourth outlet of the spout to dispense the single-serving size of the granular substance into a receptacle placed below the spout.

18. The method of claim 17, wherein the dispenser includes at least one mechanical stop configured to:
restrict rotation of the upper disc between an inactive position in which the second outlet does not overlap the first outlet, and an active position in which the second outlet is below the first outlet to permit the granular substance to pass through the second outlet; and
restrict rotation of the lower disc between an inactive position in which the third outlet does not overlap the spout, and an active position in which the third outlet is aligned with the fourth outlet of the spout to permit the granular substance to pass from the third outlet through the spout.

19. The method of claim 17, further comprising returning at least the upper disc to an inactive position in which the second outlet does not overlap the first outlet by a spring that biases at least the upper disc toward the inactive position.

20. The method of claim 17, wherein the third outlet includes one or more side walls that define a cavity having a volume, the cavity is configured to receive and dispense the single-serving size of the granular substance.

21. The method of claim 17, wherein the extent of overlap between the second outlet of the upper disc and the third outlet of the lower disc corresponds to a plurality of amounts or volumes of selectively defined single-serving sizes of the granular substance.

22. The method of claim 17, wherein the storage compartment further includes a plurality of storage containers, and where the method include manually rotating at least one of the plurality of storage containers between a first position in which the at least one of the plurality of storage containers is disposed away from the first outlet and a second position in which the at least one of the plurality of storage containers is disposed directly over the first outlet to permit the granular substance to pass from the at least one of the plurality of storage containers through the first outlet.

* * * * *